United States Patent [19]

Baganoff

[11] 3,844,659

[45] Oct. 29, 1974

[54] STRAIN GAUGE DATA REDUCTION APPARATUS AND METHODS

[75] Inventor: Frederick Baganoff, Florissant, Mo.

[73] Assignee: Baganoff Associates, Inc., St. Louis County, Mo.

[22] Filed: Dec. 11, 1970

[21] Appl. No.: 97,114

[52] U.S. Cl.............. 356/32, 250/224, 250/571, 356/167, 356/196, 356/209, 356/210
[51] Int. Cl... G01b 11/16, G01b 11/00, G01n 21/48
[58] Field of Search....... 356/32, 72, 167, 196, 209, 356/210, 212, 237; 250/219 QA, 219 DD, 231 SE, 571, 224

[56] References Cited
UNITED STATES PATENTS

| | | | |
|---|---|---|---|
| 2,551,726 | 5/1951 | Cooley | 250/219 DD X |
| 2,560,614 | 7/1951 | Walker | 250/219 DD X |
| 2,755,702 | 7/1956 | Cook | 356/196 |
| 2,803,161 | 8/1957 | Summerhayes, Jr. | 356/196 |
| 2,956,435 | 10/1960 | Rich | 356/37 |
| 3,060,747 | 10/1962 | Dunham | 356/37 |
| 3,103,651 | 9/1963 | Heinecke et al. | 250/219 DD X |
| 3,125,624 | 3/1964 | Illig et al. | 356/167 |
| 3,203,309 | 8/1965 | Skala et la. | 356/37 |
| 3,205,484 | 9/1965 | Schwertz | 250/219 DD X |
| 3,222,978 | 12/1965 | Dreyfus | 356/212 X |
| 3,415,433 | 12/1968 | Shaw, Jr. | 356/72 X |
| 3,436,556 | 4/1969 | McCartney | 356/176 |
| 3,462,223 | 8/1969 | Tiemann et al. | 356/32 |
| 3,481,672 | 12/1969 | Zoot | 356/167 |
| 3,536,895 | 10/1970 | Dedden et al. | 250/219 QA X |
| 3,592,545 | 7/1971 | Silver | 356/32 |

OTHER PUBLICATIONS

Fan, "Magneto-Optical Sensing", IBM Tech. Discl. Bulletin, Vol. 6, No. 4, 9/63 pp. 129-130.

*Primary Examiner*—Vincent P. McGraw
*Attorney, Agent, or Firm*—Stanley N. Garber

[57] ABSTRACT

Apparatus and methods for analyzing and reducing to usable form, strain data inscribed on the surface of a disk-shaped strain gauge. The apparatus comprises a turntable receiving the strain gauge and an optical system including a source of light, the turntable and optical system being carried for relative rotational and linear movement over a defined field. The optical system directs a beam of light on a portion of the disk and reflections from the disk are detected and electronically processed into digital signals representative of radial and angular scratch information on the disk.

12 Claims, 6 Drawing Figures

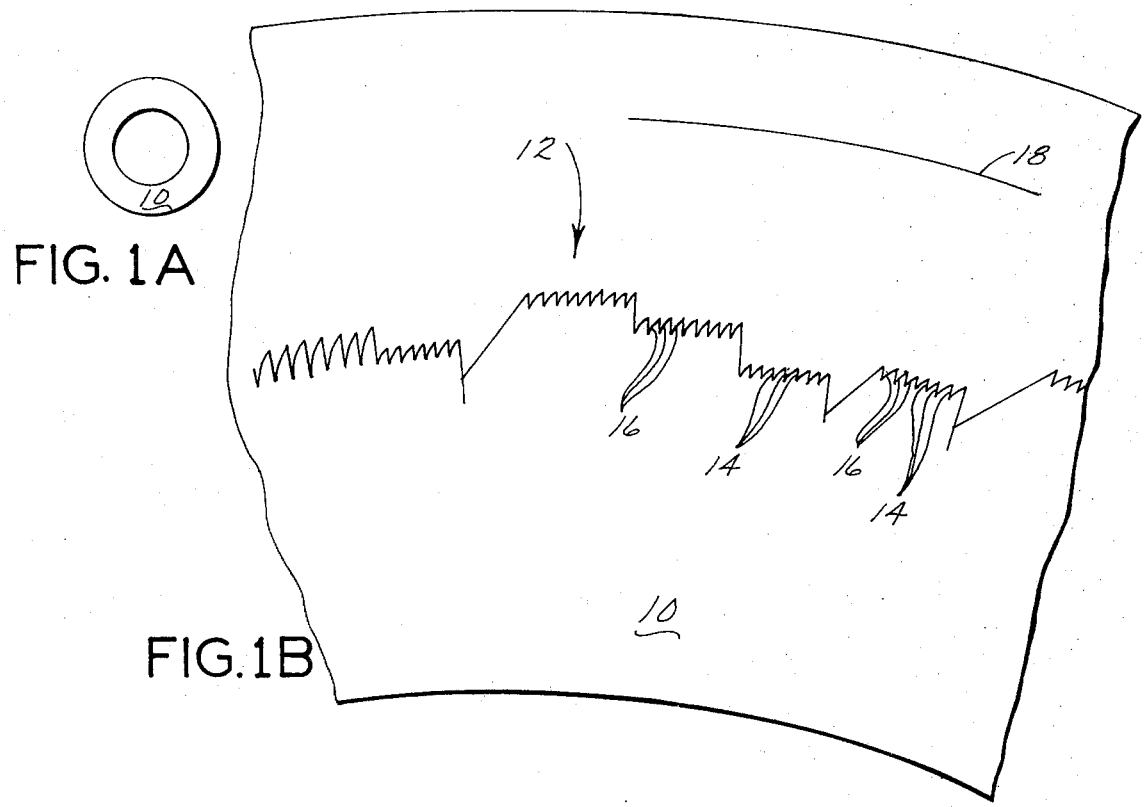
FIG. 1A
FIG. 1B
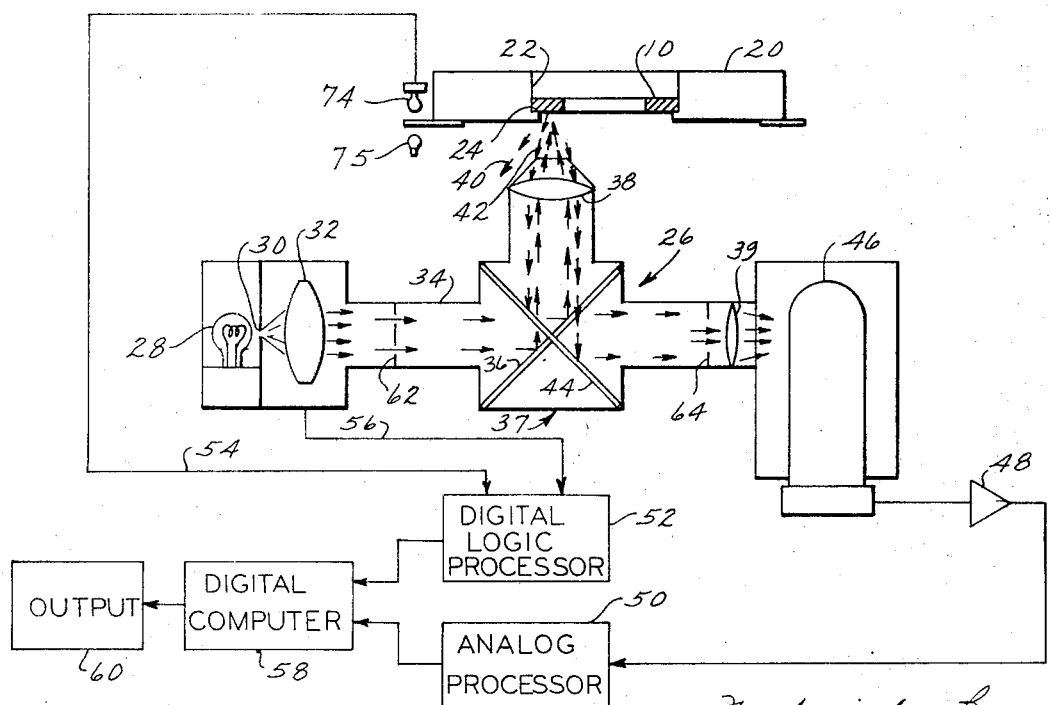
FIG. 2

STRAIN GAUGE DATA REDUCTION APPARATUS AND METHODS

BACKGROUND OF THE INVENTION

This invention pertains to apparatus and methods for analyzing strain information on a strain gauge, and more particularly to such apparatus and methods which automatically detect and reduce to a usable form, strain information inscribed on the surface of disk type strain gauge.

A well known technique for obtaining strain information to which a structural member is subjected is through the use of a scratch type strain gauge and recorder attached to the structural member. In general, a strain gauge of this type is comprised of a disk-shaped annulus formed of a soft material, such as brass, having a diameter of approximately 0.9 inch and a central opening of 0.5 inch. The recorder is a self-contained mechanical extensometer designed to measure and record total axial deformation, and thus average strain, between two points on the structural member to which it is attached. The recorder comprises a pair of base plates, one carrying a stylus and the other the strain recording disk. As the structural member is strained, the base plates move relative to each other causing the stylus to scratch the disk radially, thus recording total movement. This same relative movement, when equal to or greater than the minimum sensitivity of the recorder, causes the disk to rotate and thereby separate the record of each significant strain excursion. A reference scratch is generally inscribed on each disk by manually rotating the disk at installation, thereby establishing the initial stress level in the member under test.

In the past, strain information inscribed on the disk, after removal from the recorder, was reduced to a usable form by manually viewing the disk under magnification and measuring the length of each radial scratch inscribed on the disk by the recorder stylus. The total number of scratches and their respective lengths was either plotted or put in tabular form as a record of the strain excursions of the structural member under test or examination. This process of manual data reduction is obviously extremely laborious and time consuming, as well as subject to human error, thus limiting the usefullness of this type of system for gathering strain information.

SUMMARY OF THE INVENTION

Accordingly, among the several objects of the present invention may be noted the provision of apparatus and methods for automatically analyzing and reducing to usable form strain data scratched on the surface of a disk-type strain gauge; the provision of such apparatus and methods which reduce such strain data with a high degree of accuracy and minimum labor; the provision of apparatus and methods of the class described which minimize the effects of fingerprints, machining grooves, rough handling scratches and differences in surface brightness between disks; and the provision of such apparatus and methods which are characterized by simplicity of construction, low cost and ease of operation and use.

In general, apparatus constructed in accordance with the present invention for reducing strain information inscribed on the surface of a strain gauge comprises means for carrying the strain gauge and means for projecting a beam of light on the inscribed surface thereof. Means are provided for establishing relative rotational and linear movement between the gauge and the beam of light, and electrical circuit means are provided for detecting and processing light reflected from the surface of the gauge, the reflections varying in accordance with the strain information inscribed thereon.

The method of this invention comprises the steps of projecting a beam of light on the surface of the gauge and establishing relative angular and radial movement between the beam of light and the gauge. Reflected light from the surface of the gauge is detected and signals are generated proportional to the reflections. The signals are thereafter processed to obtain an output representative of the strain information inscribed on the gauge. These and other objects and features will be in part apparent and in part pointed out hereinafter.

BRIEF DESCRIPTION OF THE DRAWINGS

FIG. 1A is a plan view of a strain gauge with which the invention may be practiced;

FIG. 1B is an enlarged view of a portion of the gauge of FIG. 1A;

FIG. 2 is a diagramatic view of the present invention;

Corresponding reference characters indicate corresponding parts throughout the several views of the drawings.

DESCRIPTION OF THE PREFERRED EMBODIMENT

Figure 3:
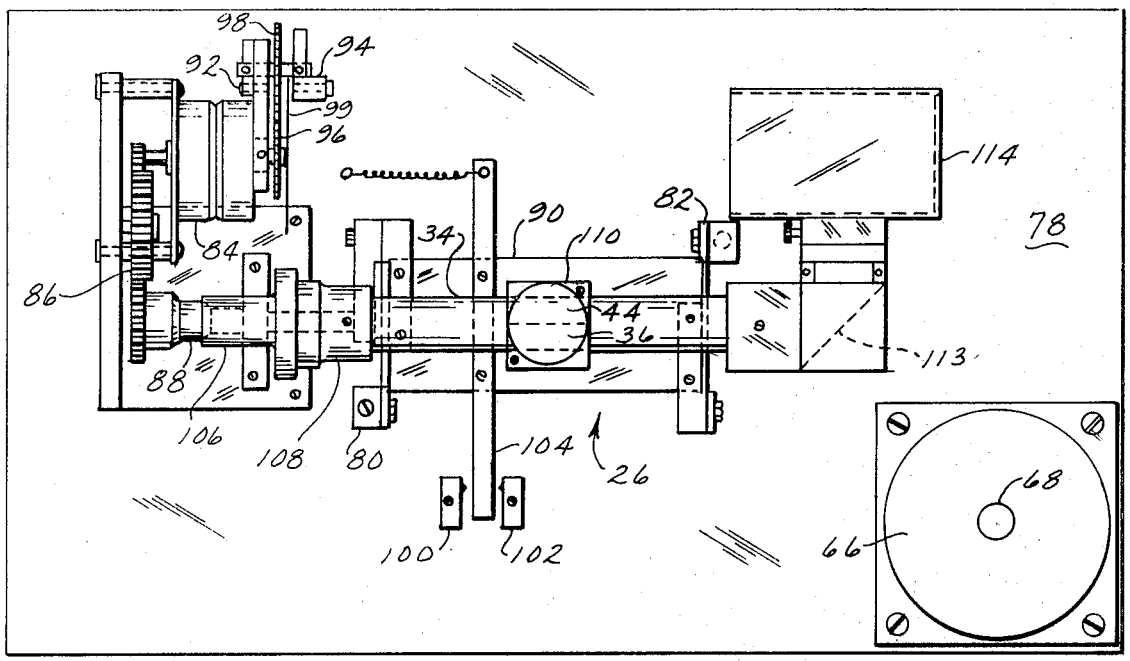
FIG. 3 is a bottom plan view of the apparatus of this invention.

Referring now to the drawings, and particularly to FIG. 1, a strain gauge for use with the present invention is illustrated at 10 as comprising an annular, disk-shaped member having a typical scratch pattern 12 inscribed thereon. The disk 10 is formed of a metallic material, such as brass, of approximately 0.9 inch diameter with a central opening of approximately 0.5 inch, providing a 0.2 inch wide annular track upon which the strain information is recorded.

A typical recorder for inscribing the disk is a self-contained mechanical extensometer designed to measure and record total axial deformation, and thus average strain, between two points on a structural member, such as an aircraft spar cap, to which it is attached. The recorder consists of a pair of plates, one carrying a stylus and the other the recording disk. The plates are independently secured by adhesives or fasteners to the structural member under test and as the structure is strained, the plates move relative to each other causing the stylus to scratch the disk radially, as illustrated at 14 in FIG. 1, thus recording the total movement. The same relative movement, when equal to or greater than the minimum sensitivity of the gauge, causes a wire brush to rotate the disk and separate the record of each significant strain excursion. Each time the disk rotates, the stylus inscribes an angular scratch on the disk, as at 16, interconnecting each radial scratch 14. A reference scratch 18 is inscribed on each disk 10 by rotating the disk manually at the beginning of each test, thereby establishing the initial stress level in the structural member.

The present apparatus for analyzing and reducing the strain data inscribed on disk 10 is diagramatically illustrated in FIG. 2 as comprising a turntable 20 having a stepped bore 22 therein. The disk 10 is carried on a lip 24 in the bore 22 of the turntable for rotation therewith. An optical system, indicated generally at 26, is linearly movable below the disk 10. The optical system comprises a light source 28 for projecting a beam of light through an aperature 30 of one to five mils diameter and to a collimating lens 32. The collimated light shines down a tube 34, strikes a first mirror 36 of a beam shear 37 and is directed toward an objective or condensing lens 38 adjacent the inscribed surface of disk 10. Since mirror 36 extends only across half of the tube 34, the beam of light in tube 34 is split and the mirror 36 projects a semicircular portion of a cone of light through objective lens 38 and onto the inscribed surface of disk 10, as will be more fully described hereinafter. A portion of the light striking disk 10 will be scattered, as indicated by arrows 40, and the remaining light will be reflected back down into the optics, as indicated by arrows 42. The reflected light is collimated by lens 38 and projected against a second mirror 44 occupying the other half of the beam shear adjacent mirror 36, is condensed by a lens 39, and reflected toward a photomultiplier tube (PMT) 46.

The amount of light reflected back into the optics from the surface of disk 10 will vary with the condition of the surface of the disk, i.e., the presence or absence of a scratch. Thus, when the light beam falls on a scratch in the surface of disk 10, a signal will be generated by PMT 46 which is electronically processed to provide the desired strain information output. In general, as illustrated in FIG. 2, the PMT output is fed to a buffer amplifier 48 and then into an analog processor 50. Signals indicative of the angular and radial position of the beam of light on the disk surface are provided via lines 54 and 56, respectively, to a digital logic processor 52 and the outputs of the digital and analog processors are fed to a digital computer 58 and thereafter to an output device 60, as will be explained more fully hereinafter.

The present invention generates a signal representative of scratch information inscribed on the surface of the disk. This signal is optically generated by reflected light from the disk surface, and may be obtained through one of several alternate methods; e.g., the so-called dark field, light field or depth field methods. In all systems, the beam of light projected against and reflected from the disk surface is modified by either canting the beam shear 37 or by use of a series of apertured masks in tube 34 so that the amount of reflected light received by PMT 46 is either greater or lesser when the light falls on a scratch than when it falls on an unscratched area of the disk. For example, in the so-called dark field system, a mask 62 may be provided in tube 34 between collimating lens 32 and beam shear 37 to permit only an annular band of light to be projected against the disk. A second mask 64 is provided in tube 34 between beam shear 37 and PMT 46 to permit only a center spot of reflected light (corresponding to the masked out center of mask 62) to be projected against PMT 46. Thus, if the surface of disk 10 is smooth because of the absence of a scratch, it will theoretically act as a perfect reflector and will return all light in the same manner as projected thereagainst. The annular ring of light will therefore be blocked by mask 64 and no light will reach PMT 46. If, however, a scratch is present on the surface of disk 10, the annular ring of light will be disturbed and a portion of the reflected light from the disk will pass through the center aperture in mask 64 and reach PMT 46, generating a signal of increased magnitude representative of the presence of a scratch. In the light field system, identical masks are used in tube 34 on opposite sides of beam shear 37 so that reflected light will reach PMT 46 only when the surface of disk 10 is unscratched, thereby generating a signal of decreased magnitude representative of the presence of a scratch. In the depth field system, the beam of light is projected against the disk such that it is focused only in the plane of the bottom of a scratch and is defocused at the surface of the disk. A lens and mask are provided between beam shear 37 and PMT 46 such that light will pass to the PMT only if it is reflected from its focal point (the valley of a scratch) on the disk. While the present invention will be described herein in connection with the dark field system, it should be understood that any of these systems may be advantageously used. In addition, in the light and dark field systems, masks 62 and 64 may be eliminated and the masking effect provided by proper positioning of the mirros of beam shear 37 in the paths of the projected and reflected light.

Figure 4:
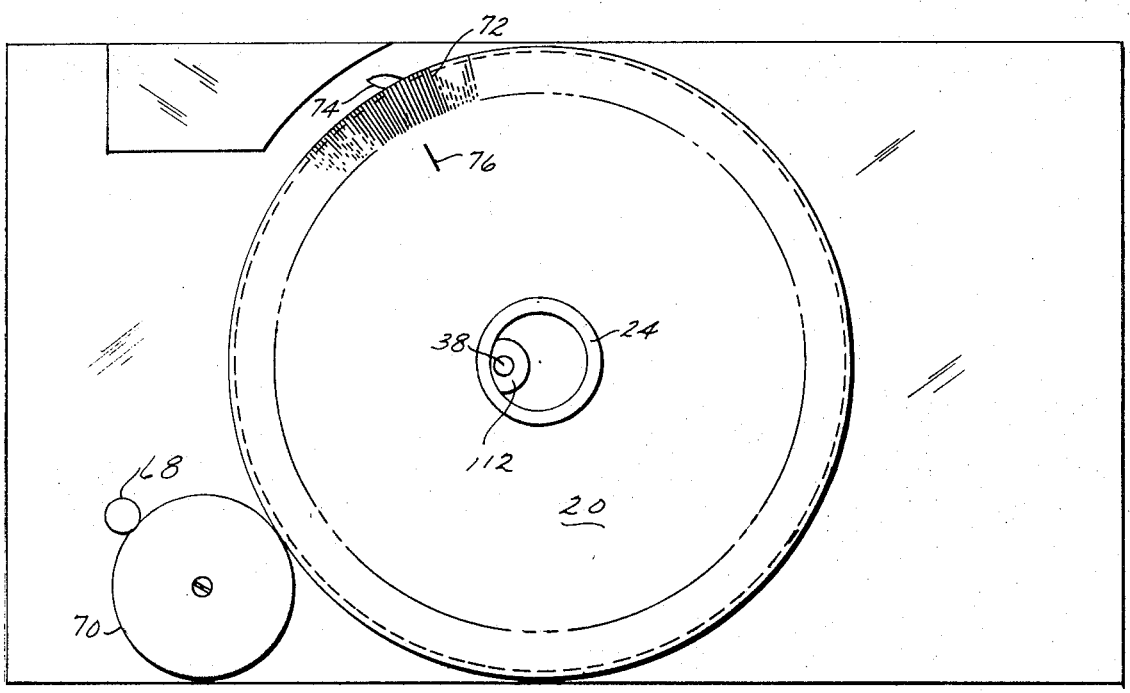
FIG. 4 is a top plan view the apparatus of FIG. 3.

Referring now to FIGS. 3 and 4, the turntable 20 is driven in rotation by an electrical motor 66 having a shaft 68 driving an idler wheel 70 engaging the rim of the turntable. Plural strobe timing lines 72 extend radially inwardly from the periphery of turntable 20 around the circumference thereof. A phototransistor 74 and light source 75 (FIG. 2) are mounted adjacent strobe lines 72 for providing angular timing signals representative of the angular position of the turntable and, hence, disk 10 carried on lip 24 thereof. A single angular reset line 76 is also provided on the turntable for providing an angular reset pulse signal for each revolution of the turntable.

The optical system 26 is mounted under turntable 20 on a base plate 78 for limited linear movement by a pair of flexual pivots 80 and 82 secured to the plate 78 on opposite sides of tube 34. Linear movement is provided by a stepper motor 84 through a gear train 86 and a micrometerlike spindle 88, the motor advancing the tube 34 and optical system 26 on a platform 90 each time a pulse is applied thereto. A radial reset signal is provided via a photodiode 92 and a light source 94 carried on opposite sides of a pair of gears 96 and 98, the latter having slots therein for permitting light from source 94 to reach diode 92 through an apertured disk 99 only at one point in the limits of linear travel of the platform 90. Stepper motor reversing limit switches 100 and 102 are also provided which are actuated by a spring biased arm 104 carried by platform 90.

The light source 28 is carried in a housing 106 at the end of spindle 88, followed by the aperture 30 and collimating lens 32 in a housing 108. The beam shear, consisting of mirrors 36 and 44, are carried in a housing 110 having a barrel 112 (FIG. 4) extending upwardly therefrom for objective lens 38. A mirror 113 is also provided at the end of tube 34 for directing the reflected light to a housing 114 containing PMT 46.

As shown in FIG. 4, objective lens 38 is positioned directly below the disk carrying opening in turntable 20 and is adapted to move radially across the disk as the platform 90 is moved by motor 84. Thus, since the turntable and disk are rotating, the beam of light projected through objective lens 38 scans the entire annular track of the disk.

As set forth above, the beam shear splits the beam of light so as to project a semicircular cone of light on the surface of the disk. Since the light is focused to a spot by objective lens 38 on the surface of disk 10, light impinges on the disk from an angle approximately 180°. Therefore, even if the scratch inscribed on the disk is curved, the light will strike it orthogonally insuring predictable reflections from the disk.

Figure 5:
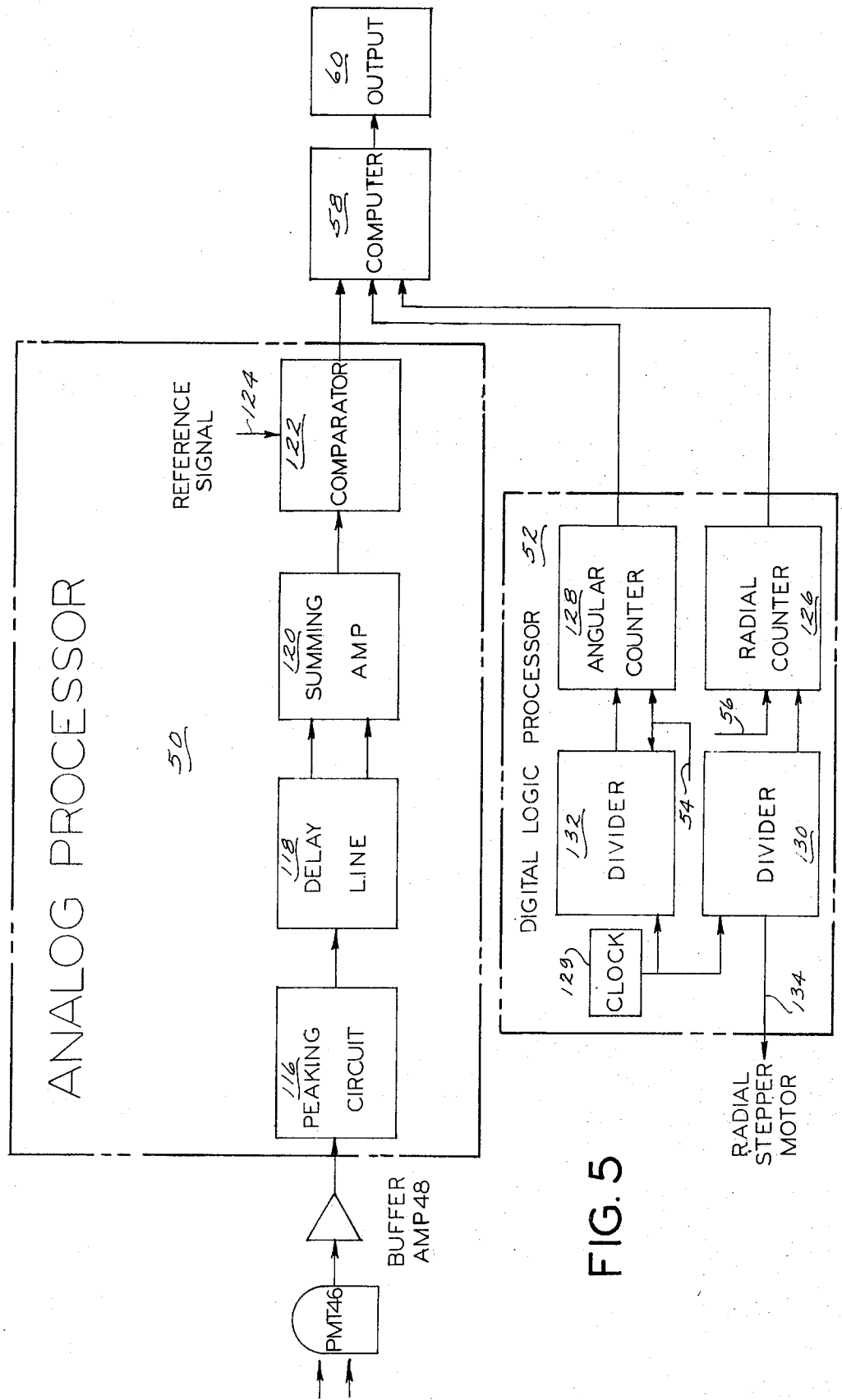
FIG. 5 is a block diagram of the electronic circuitry of this invention.

The signal generated by PMT 46 is directed to the buffer amplifier 48 which serves to match the high impedance output of the PMT to the relatively low impedance input of the analog processor 50. As best illustrated in FIG. 5, the analog processor 50 is comprised of a frequency selective peaking circuit 116 for reinforcing the pulse signals from buffer amplifier 48. An analog delay line 118 delays the signal from peaking circuit 116 using sample-and-hold circuitry and provides adjustably delayed and undelayed signals to a summing amplifier 120 where both signals are summed to provide a difference signal output to a comparator 122, the difference signal comprising a series of pulses of relatively fixed amplitude and pulse width. At comparator 122 the difference signal is compared to a reference signal 124 and a logic level pulse output is provided to computer 58 each time the difference signal exceeds the reference signal. This digital series of pulses, representative of the presence of scratches on the surface of disk 10, is supplied to computer 58, together with the angular and radial output information of digital logic processor 52.

In general, the digital logic circuitry 52 is comprised of a radial counter 126 and an angular counter 128, each counting the output of a divider 130 and 132, respectively. Dividers 130 and 132 receive the output of a clock 129 and supply separate predetermined signals, the frequency of which depends on the desired resolution, to the counters. Divider 130 also provides a series of output pulses 134 for driving radial stepper motor 84. In addition, radial counter 126 is updated to a reference point on the radial travel of the optical system across the disk by the radial reset signal generated by photodiode 92 and supplied via line 56.

The angular divider 132 is synchronized via line 54 by the angular strobe signals generated by phototransistor 74 and strobe lines 72, while the angular counter 128 is reset once each revolution of the turntable via the signal generated by strobe line 76, thus insuring that both the angular and radial counters start out in unison and remain synchronized throughout the operation of the apparatus.

The outputs of angular counter 128 and radial counter 126 are provided to computer 58 together with the output of comparator 122. As set forth above, comparator 122 only provides a signal to computer 58 when a scratch in the surface of disk 10 is detected. The computer is programmed such that each time a signal is received from comparator 122, the angular and radial position of the optical system, as provided by angular and radial counters 128 and 126, is noted and a discrete data point is entered into the computer memory. The computer program then sorts and assembles the data points and reconstructs each scratch 14 on disk 10. The output data from computer 58 is provided to an output device 60, such as a plotter or tubulator, so that a printed record of the length and position of each scratch on the disk is presented. With this information, the stress which the structural member carrying the disk has experienced may be calculated.

In view of the above, it will be seen that the several objects of the invention are achieved and other advantageous results obtained.

As various changes could be made in the above constructions and methods without departing from the scope of the invention, it is intended that all matter contained herein shall be interpreted as illustrative and not in a limiting sense.

What is claimed is:

1. Apparatus for analyzing strain information inscribed in the surface of a flat, circular strain gauge comprising means for carrying said strain gauge, means for projecting a beam of light on the inscribed surface of said gauge, means for moving said carrying means and projecting means for establishing relative rotational and radial movement between said strain gauge and said beam of light to scan said gauge both angularly and radially, means for detecting light reflected from the surface of said gauge for providing an electrical signal responsive to said reflected light, said reflections varying in accordance with the strain information inscribed on the surface of said gauge, and means for processing said signal to provide data representative of the scratch information inscribed on the surface of said gauge.

2. Apparatus as set forth in claim 1 wherein said means for carrying said gauge comprises a turntable for establishing said relative rotational movement.

3. Apparatus as set forth in claim 2 wherein said light projecting means comprises an optical system comprising a source of light, means for collimating said light and means for directing said light against said gauge surface.

4. Apparatus as set forth in claim 3 wherein said optical system further comprises means for splitting said beam of light and projecting a semi-circular light pattern on said gauge surface.

5. Apparatus as set forth in claim 4 wherein said optical system is mounted for linear movement over a defined field for scanning said beam of light radially across at least a portion of said disk, thereby establishing said relative radial movement.

6. Apparatus as set forth in claim 5 wherein said detecting means comprises a light detector for generating a series of signals proportional to the level of reflected light, and said processing means comprises circuit means for syncronizing said signals with said rotational and radial movment of said gauge and optical system for coordinating each signal with a discrete location on the surface of said gauge, and output means for converting said signals to said data representative of the scratch information inscribed on the surface of said gauge.

7. A method for analyzing strain information inscribed on the surface of flat, circular strain gauge comprising the steps of projecting a beam of light on said gauge, moving said gauge and beam of light for scanning said beam of light across said gauge in both angular and radial paths, detecting reflected light from the surface of said gauge and generating signals proportional thereto, and processing said signals to obtain output data representative of the strain information inscribed on said gauge.

8. The method set forth in claim 7 comprising rotating said gauge for establishing said angular path.

9. The method set forth in claim 8 comprising linearly moving said beam of light for establishing said radial path.

10. The method set forth in claim 9 further comprising splitting said beam of light in a beam shear and projecting a semi-circular light pattern on the surface of said gauge.

11. The method set forth in claim 7 further comprising masking selected portions of said beam of light from being projected against said gauge and thereafter masking the unmasked portions of said beam from being reflected to a detector, thereby generating signals of increased magnitude when a scratch is detected.

12. The method set forth in claim 7 further comprising masking selected portions of said beam of light from being projected against said gauge and thereafter masking the same portions of said beam from being reflected to a detector, thereby generating signals of decreased magnitude when a scratch is detected.

* * * * *